United States Patent [19]

Sarich

[11] E Re. 29,230

[45] Reissued May 24, 1977

[54] ROTARY MOTOR

[76] Inventor: Tony Ralph Sarich, 9 Halse Place, Karrinyup, Australia

[22] Filed: Jan. 22, 1976

[21] Appl. No.: 651,592

Related U.S. Patent Documents

Reissue of:

[64] Patent No.: 3,787,150
Issued: Jan. 22, 1974
Appl. No.: 159,834
Filed: July 6, 1971

[30] Foreign Application Priority Data

July 6, 1970 Australia ..... 1737/70

[52] U.S. Cl. ..... 418/61 R; 123/8.45; 418/151

[51] Int. Cl.[2] ..... F02B 53/00

[58] Field of Search ..... 123/8.45; 418/61 R, 418/63, 64, 151, 177

[56] References Cited

UNITED STATES PATENTS

| | | | |
|---|---|---|---|
| 448,336 | 3/1891 | Gollings | 418/61 R |
| 1,594,035 | 7/1926 | Bailey | 123/8.45 |
| 1,686,505 | 10/1928 | Stastny | 418/151 X |
| 2,295,117 | 9/1942 | Koester | 123/8.45 |
| 2,427,253 | 9/1947 | Browne | 418/61 R X |
| 3,063,429 | 11/1962 | Niemann | 418/61 |
| 3,132,632 | 5/1964 | Kehl | 123/8.45 |
| 3,312,201 | 4/1967 | Glasoe | 123/8.45 |
| 3,318,291 | 5/1967 | Hallenbeck | 418/61 X |
| 3,368,537 | 2/1968 | Cavallone | 123/8.45 |
| 3,812,828 | 5/1974 | Griffiths | 123/8.45 |

FOREIGN PATENTS OR APPLICATIONS

| | | | |
|---|---|---|---|
| 164,947 | 12/1949 | Austria | 123/8.45 |
| 716,565 | 10/1931 | France | 418/173 |
| 295,146 | 4/1965 | Netherlands | 123/8.45 |
| 973,191 | 10/1964 | United Kingdom | 123/8.45 |

*Primary Examiner*—Carlton R. Croyle
*Assistant Examiner*—Michael Koczo, Jr.
*Attorney, Agent, or Firm*—Wenderoth, Lind & Ponack

[57] ABSTRACT

A rotary vanes type motor having a plurality of vane mounted for reciprocal movement in a housing in a radial direction with respect to a shaft journalled in the housing. A piston member is eccentrically mounted on the shaft in the housing so that the piston member will orbit without rotation in the housing as the shaft rotates. The vanes are connected to the piston member so as to reciprocate when the piston member orbits. The housing, vanes, and piston member defining a plurality of chambers to which a working fluid may be admitted in sequence to induce orbiting of the piston member and resulting rotation of the shaft.

9 Claims, 4 Drawing Figures

INVENTOR

TONY RALPH SARICH

BY Wenderoth, Lind & Ponack

ATTORNEYS

INVENTOR
TONY RALPH SARICH

BY Wenderoth, Lind & Ponack
ATTORNEYS

INVENTOR

TONY RALPH SARICH

BY Wenderoth, Lind & Ponack

ATTORNEYS

INVENTOR

TONY RALPH SARICH

BY Wenderoth, Lind + Ponack

ATTORNEYS

ROTARY MOTOR

Matter enclosed in heavy brackets [ ] appears in the original patent but forms no part of this reissue specification; matter printed in italics indicates the additions made by reissue.

This invention relates to a rotary motor which may be operated on the internal combustion engine principle, but may also operate as a steam engine or hydraulic motor.

There have been proposed numerous constructions of rotary motors, many incorporating sliding vanes which divide a cavity formed between a stationary and rotary member into a plurality of chambers. A common problem encountered in previously proposed vane-type rotary motors, is the provision of adequate support for the sliding vanes, and the maintaining of an effective seal between the sliding vanes and the stationary housing and rotor. It has been the practice to support the vane for reciprocating sliding movement either in the stationary housing or in the rotor, with the projecting portion of the vane completely unsupported. Suitable spring devices are provided to urge the vanes in a direction to maintain engagement between the free end of the vane and the rotor or housing as the case may be.

One principal disadvantage of these constructions is that the vane is only supported at one end and thus, when the vane is in its extended position, it is subjected to substantial bending stresses. In order to withstand these stresses it has been necessary to use vanes of substantial thickness and hence of increased weight. The weight of the vanes introduces inertia problems and consequently necessitate strong spring devices to induce the necessary movement in the vanes to maintain contact at their free end with the co-operating rotor or housing. Also deflection of the vane due to only one end being supported causes increased frictional resistance to sliding movement of the vane.

It is the principal object of the present invention to provide a rotary motor of the vane-type, in which the supporting and sealing problems inherent in previously proposed vane-type rotary motors are substantially reduced to provide an effective motor.

With the above stated object in view, there is provided an engine comprising a housing having a cavity defined by an internal peripheral wall and opposed end walls, a shaft rotatably supported in the housing, a piston member journalled eccentrically on said shaft to describe an orbital path within the cavity upon relative rotation between the shaft and housing, a plurality of vanes disposed radially to and spaced equally about the shaft axis and supported in the housing for reciprocal movement radially with respect to the shaft axis, said vanes being connected to the piston member so that the piston member can move relative to each vane in a direction at right angles to the direction of reciprocation of the respective vane and at right angles to the shaft axis to permit orbiting of the piston member upon reciprocation of the vanes relative to the housing, sealing means operatively disposed between each vane and the piston member, the housing peripheral wall and the housing end walls to divide the cavity into a plurality of chambers the volume of each chamber varying as the piston member orbits, and means to regulate the admission to and exhausting from each chamber in sequence of a working fluid to induce orbiting of the piston member and resultant rotation of the shaft.

As the piston member describes a purely orbital movement, there is no angular movement between the vanes and the piston member, and consequently the vanes may be connected to the piston member. Accordingly, it is not necessary to provide any spring devices to induce the reciprocating movement of the vanes as this is positively induced by the connection between the vanes and piston member.

The orbital movement of the piston member within the cavity of the housing is such that the piston member maintains a constant angular relation to any diametral plane passing through the shaft axis.

As the vanes are only subjected to pure reciprocal movement relative to the housing each vane may be slidably supported in respective radial slots in each end wall and peripheral wall of the cavity.

Thus there is provided an engine comprising a housing having a generally cylindrical cavity defined by a peripheral wall and opposed end walls, a shaft rotatably supported in the housing coaxial with the cavity, a piston member disposed within the cavity and journalled eccentrically on said shaft to describe an orbital path about the shaft axis when the shaft rotates, a plurality of vanes disposed radially to and spaced equally about the shaft axis, each vane being slidably supported in respective slots in each wall and the peripheral wall for reciprocal movement radially with respect to the shaft axis, each vane being connected to the piston member to reciprocate relative to the housing upon orbiting of the piston member to the housing, sealing means operatively disposed between each vane and the piston member, the housing peripheral wall and the housing end walls to divide the cavity into a plurality of chambers, the volume of each chamber varying as the piston member orbits, and means to regulate the admission to and exhausting from each chamber in sequence of a working fluid to induce orbiting of the piston member and resultant rotation of the shaft.

The supporting of the vanes in the slots in the end walls of the chamber substantially reduces the stresses in the vanes, particularly when they are in their extended position, and thus the vanes will not bend or deflect, and may be made of a lighter construction with a resultant reduction in inertial loads.

Some further advantages inherent in this construction are:

1. There is no contact between the peripheral surfaces of the piston member and the chamber, and thus accurate machining of these surfaces is not necessary, and there is no wearing thereof.
2. The pressure differential on the opposite sides of the vanes, at any point in their working cycle, is small in comparison with many other vane type engines. The maximum pressure differential occurs when the vane is retracted to its fullest extent, and hence has a minimum area exposed to the pressure difference.
3. The surfaces of the vanes which are in wearing contact with the piston member or housing may be flat surfaces, and thus uniform wear on these surfaces does not interfere with their functioning. The flat surfaces also simplify seal construction as flat seal strips may be used.
4. Lubrication and cooling of the vanes may be simply effected by an oil spray directed onto the face of the vanes when in the retracted position as substantially the whole surface of the vane is then outside the working chamber. Further, the incoming charge of gas will contact a large exposed surface of the vane as the vane is in its fully extended position.

Conveniently there is provided at least one member having two journalled sections eccentric with respect to one another, one rotatably supported in the housing and the other in the piston member with the axes thereof parallel to the shaft axis, the eccentricity of the journalled sections and the location thereof relative to the shaft being such as to guide the piston member in the orbital path when the shaft rotates. Preferably there are three such members spaced equally about the shaft axis.

The invention will be more readily understood from the following description of an internal combustion engine as illustrated in the accompanying drawings. The engine illustrated operates on the two-stroke cycle, but it will be readily understood that by the provision of suitable valve mechanisms, the engine may operate on the four-stroke cycle. Similarly, it will be readily understood that with appropriate modification, the engine may operate as a steam engine or hydraulic motor.

Referring now to the drawings.

Figure 1:
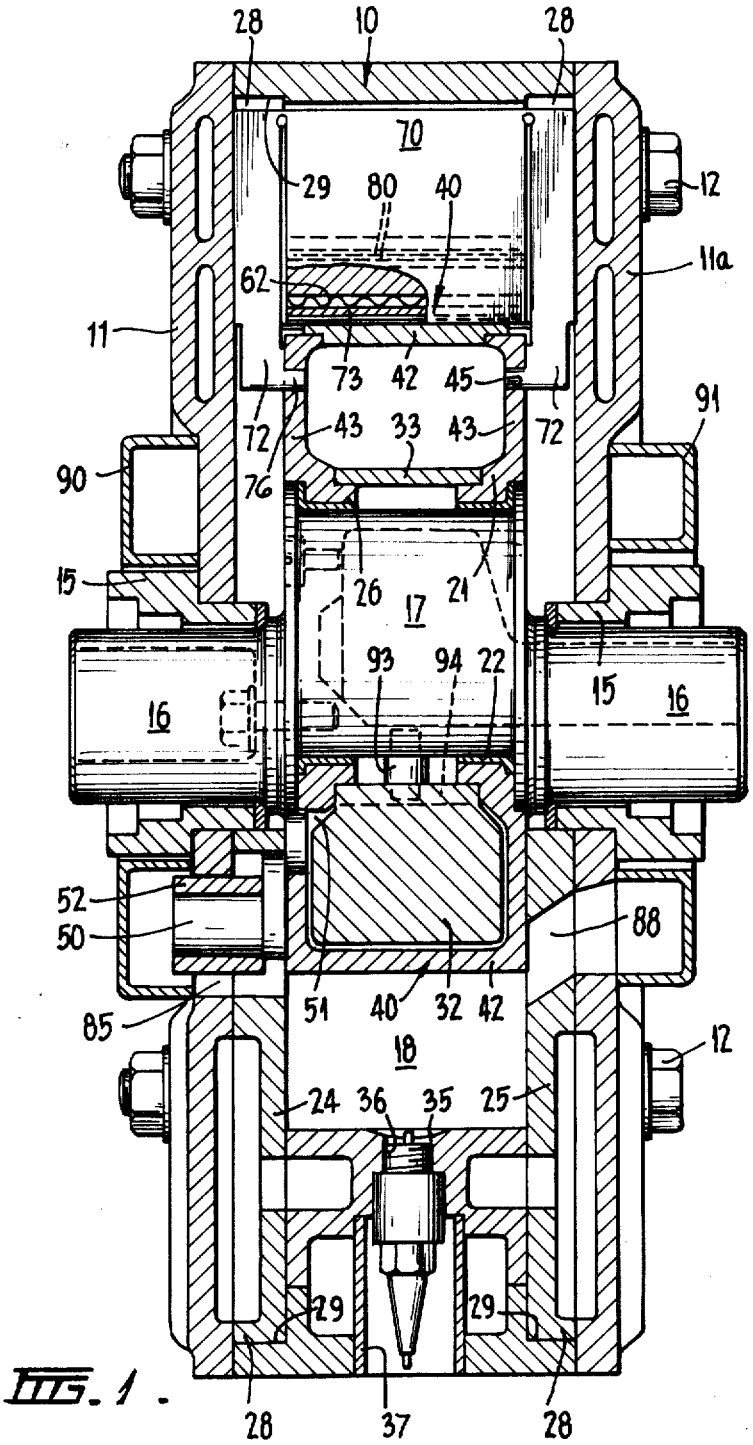
FIG. 1 is a section view of the engine along a diametral plane.
Figure 2:
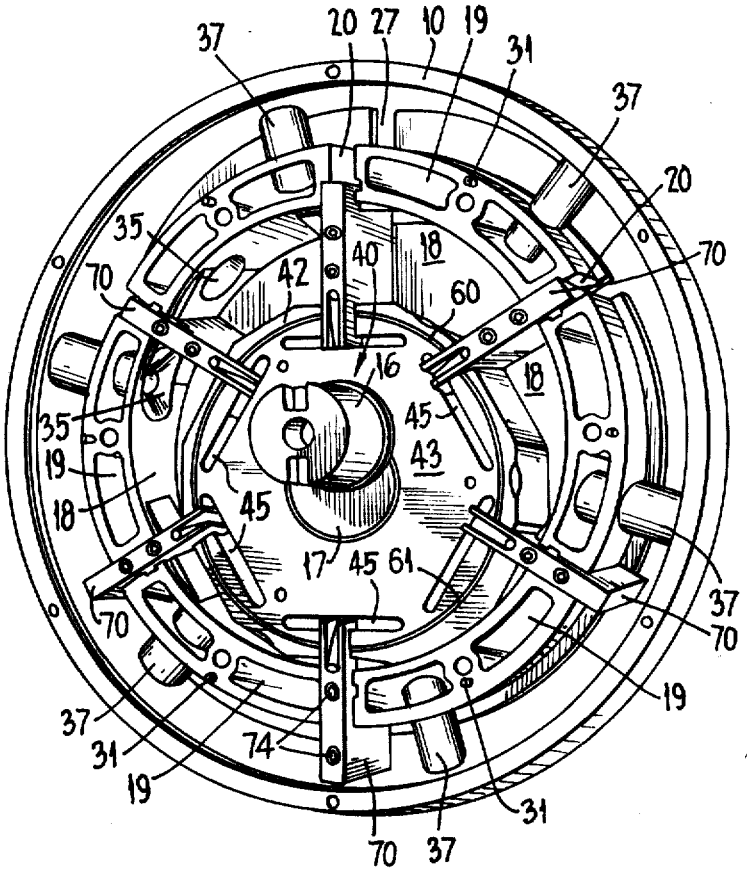
FIG. 2 is a perspective view with the exhaust end cover and chamber end plates removed to show the cam member and vanes.
Figure 3:
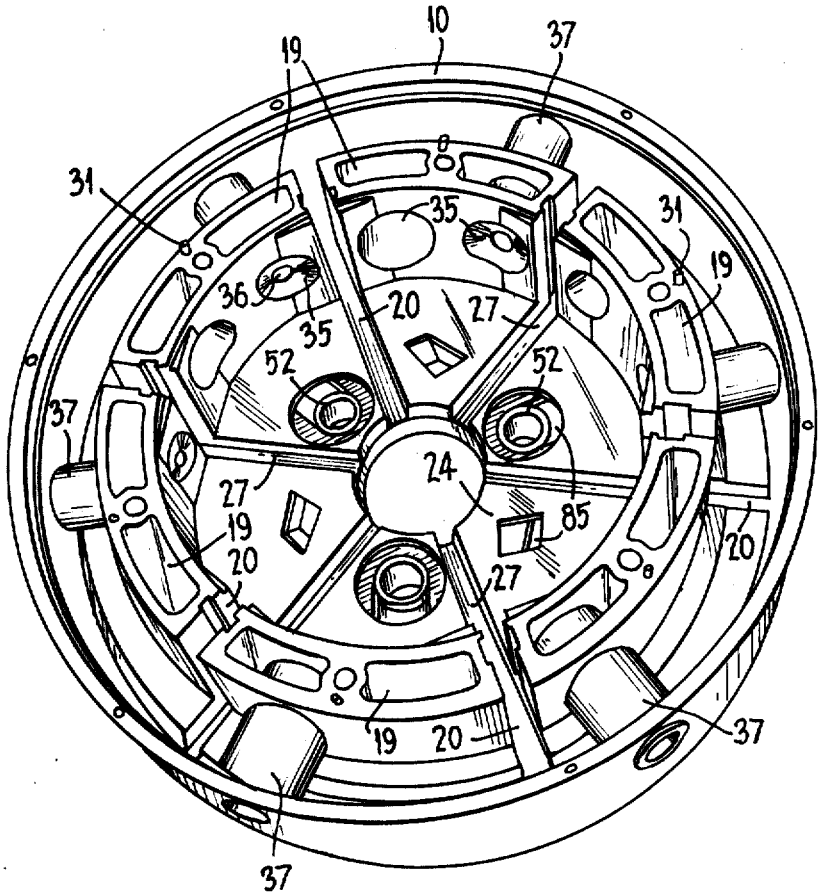
FIG. 3 is a perspective view similar to FIG. 2 with the vane and cam member also removed.
Figure 4:
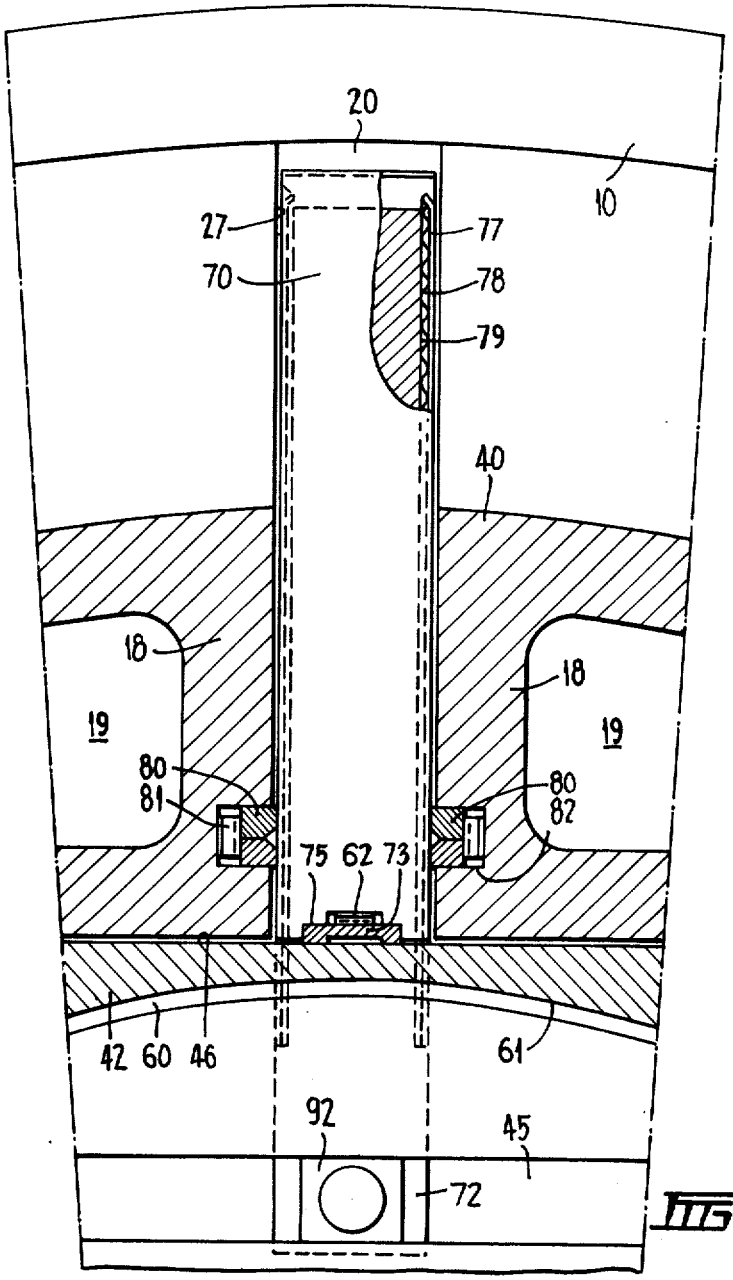
FIG. 4 is an enlarged sectional view of portion of the housing and cam member showing the arrangement of seals for one vane.

The engine comprises a cylindrical outer casing 10, opposed end cover plates 11, 11a attached by bolts 12 around their periphery to the outer casing 10. Bearings 15 supported in the cover plates rotatably support the crank shaft 16 for rotation about an axis co-axial with the outer casing 10.

The six arcuate peripheral combustion chamber sections 18 are disposed within the outer casing 10 in a generally circular formation co-axial with the shaft 16. The chamber sections 18 have cavities 19 formed therein which constitute a cooling water jacket. The arcuate length of the chamber sections 18 is such that when assembled slots 20 are provided between adjacent sections 18, the slots 20 extending the full axial and radial dimension of the sections and radially with respect to the crank shaft. The six chamber sections define an internal surface of generally hexagonal shape with the corners of the hexagon rounded by a curved surface which blends smoothly with the adjacent straight sides.

Associated with each of the chamber sections 18 are two opposed chamber end plates 24, 25, of generally sector shape, which extend from the outer casing 10 to the vicinity of the crank shaft 16. The chamber end plates 24, 25 also define between adjacent radial faces, radial slots 27 which register with the slots 20 defined by the chamber sections 18. The outer peripheral edge 28 of the chamber end plates are received in the recess 29 in the outer casing 10 and the end cover plates 11, 11a, chamber sections 18 and chamber end plates 24, 25, and held in assembly by the bolts 12 extending through aligned apertures therein and the locating dowels 31.

Two parts spherical combustion cavities 35 are provided in the internal peripheral surface of each chamber section 18, with a threaded spark plug aperture 36 communicating with one of each cavities. Associated with each spark plug aperture 36 is a sleeve 37 extending between the chamber section 18 and its outer casing 10 to house, and provide access, to the spark plug.

The crank shaft 16 has the piston member 40 mounted on the eccentric journal 17 of the crank shaft through the bearings 21 to permit relative angular movement therebetween. The piston member 40 comprises the peripheral ring and integral side plate 42, and attached side plate 43, with six equally spaced slots 45 in each side plate. The slots 45 in each side plate are arranged in the formation of a hexagon having an axis coincident with the axis of the eccentric journal 17 of the crank shaft. Corresponding slots 45 in the respective side plates 42, 43 are in alignment in the axial direction.

The three eccentrics 50 are supported in bearing 52 in the inlet end cover plate 11 in equally spaced relation about the axis of the crank shaft and engage apertures 51 in side plate 43 of the piston member 40. The throw of the eccentrics 50 are arranged in relation to that of the crank shaft so that when the crank rotates the piston member describes an orbital path. The orbital path is such that the slots 45 retain a contstant angular relation to any radial plane passing through the axis of the crank shaft 16. Annular seal rings 60, located in respective grooves 61 in each side plate of the piston member, are pressed against the chamber end plates by the respective spring strips below the seal rings.

The crank shaft 16 is of two-piece construction whereby the web 21 and journal 22 may be detached from the eccentric journal 17 to permit assembly of the piston member 40 to the journal 17. The counterweight 32 has an integral cylindrical mounting portion 33 rotatably supported on the spigots 26 on the respective side plates of the piston member. The counterweight is disposed diametrically opposite the eccentric journal 17 of the crankshaft and is caused to rotate with the crankshaft by the pin 93 engaging the slot 94 in the counter-weight. The counter-weight is made of bronze so that the bearing bushes are not required. This arrangement of the counter-weight provides both static and dynamic balance. The vanes 70 are of generally rectangular shape and are supported in the slots 20 and 27 for sliding movement in the radial direction relative to the crank shaft 16. Each vane 70 is connected to the piston member 40 by two legs 72 extending along each radial edge of the vane and secured to the vane by studs 74. The laterally projecting pin 76 at the inner end of each leg is received in a slipper 92 which slidably engages the respective slots 45 in each side plate of the piston member so that the vanes reciprocate in response to orbital movement of the piston member 40. The seal strip 73 located in the recess 75 in the radially inner edge of the vane engages the outer perpheral surface 46 of the piston member. The spring strip 62 below the seal strip 73 maintains the latter in engagement with the peripheral surface 46.

It will be noted that the portions of the peripheral surface of the piston member along which the respective vanes move are flat and parallel to the associated slots 45 in the side plate. The peripheral surface of the piston member 40 is thus of generally hexagonal shape with the corners rounded.

Seal strips 77 and associated spring strip 78 are provided in radially extending grooves 79 in each side face of each vane, adjacent each end thereof. The seal strips 77 engage the walls of the radial slots 27 formed between the chamber end plates 24, 25.

Further seal strips 80 and associated spring strips 81 are provided in grooves 82 in each end face of the arcuate chamber sections 18 to engage the opposite side faces of each vane.

The construction so far described provides sic chambers defined by the arcuate sections 18, the chamber end plates 24, 25 the vanes 70, and the piston member 40. During each complete cycle of orbital movement of the piston member the volume of each chamber undergoes a complete cycle of variation from minimum to maximum and return to minimum. It will be thus understood that the application of a fluid under pressure to each chamber in sequence when the chambers is at or near minimum volume will apply a force to the portion of the piston member of the chamber to induce orbital movement of the piston member 40 and resultant rotation of the crank shaft 16.

The following description relates to the further details of construction shown in the drawings relevant to an internal combustion engine but it will be readily understood by those skilled in the art the nature of modification necessary in order to operate the engine by the use of other working fluids such as steam or hydraulic fluid.

Referring again to the drawings, inlet ports 85 extend through the end cover plate 11 and the respective chamber end plates 24 to communicate with the respective chambers. The ports 85 are opened and closed by the piston member 40 during the orbital movement thereof. Similar exhaust ports 88 are provided in the opposite end cover plate 11a and chamber end plates 25, and are likewise opened and closed by the piston member 40. It will be noted that three of the inlet ports 85 are in the vincinity of the bearings 52 supporting the eccentrics 50.

Each inlet port 85 communicates with the inlet manifold 90 and all exhaust ports 88 communicate with the exhaust manifold 91.

This porting arrangement allows the engine to operate on the two stroke cycle, and the actual shape and location of the ports may be readily determined by those skilled in the art.

As the two stroke cycle does not provide suction to draw the mixture into the chamber, a suitable blower (not shown) is provided to deliver the mixture to the inlet manifold 90 communicating with each inlet port 85. The blower may be driven by the crank shaft 16 or may be an exhaust driven turbo-blower. The fuel may be supplied by a conventional carburetor or a fuel injection system may be used. It will be appreciated that the engine may also operate on the diesel principle, either two or four stroke cycle.

If the engine is to operate on the four stroke cycle inlet and exhaust ports may be provided in the arcuate peripheral chamber section 18 with mechanically or other suitably operated valves to control the admission and exhaust of the charge to each chamber.

A feature of this engine is that the rate of increase in volume of each chamber relative to the angular movement of the crank shaft is not uniform, the rate being initially high. In the engine shown in the drawings the volume of each cylinder increases to approximately 68 percent of maximum volume during the initial 90° of rotation of the crank shaft from top dead centre. This results in a high torque at low engine revolutions.

The engine shown in the drawings has provision for the fitment of conventional spark-plugs and these would be energised in sequence by a conventional magneto or coil and distributor ignition system. If the engine operated on the diesel principle, a suitable injector would be fitted to as a substitute for the spark-plug.

In order to reduce the loading on the connections between the vanes and the orbiting piston member the gallery between the outer casing 10 and the chamber sections 18, may be filled with a liquid such as oil, as the vanes are moved in a radially outward direction by the orbiting piston member, the oil displaced by the outwardly moving vanes will impart a corresponding radially inward movement to other vanes and consequently the inwardly directed force applied by the piston member to the inwardly moving vanes will be reduced. Alternatively, or in addition, the ends of the vanes adjacent the piston member may have surfaces projecting laterally therefrom within the engine chambers, so that the fluid pressure in the chambers will apply a force to the vanes to move them in a radially inward direction.

I claim:

1. An engine comprising a housing having a cavity defined by an internal peripheral wall and opposed end walls; a shaft rotatably supported in said housing; a piston member journalled eccentrically on said shaft to describe an orbital path within said cavity upon relative rotation between said shaft and housing; a plurality of vanes disposed [ radially to and spaced equally ] about the axis of said shaft and supported in said housing for reciprocal movement [ radially ] with respect to said shaft axis, each of said vanes being connected to said piston member so that said piston member can move relative to each vane in a direction at right angles to the direction of reciprocation of the respective vane and at right angles to said shaft axis to permit orbiting of said piston member upon reciprocation of said vanes relative to said housing; *a plurality of flat faces on the periphery of the piston member, the radially inner face of each vane engaging a respective flat face on the piston member parallel to the direction of relative movement between the vane and the piston member throughout the extent of said movement;* sealing means operatively disposed between each of said vanes and said piston member, said housing peripheral wall and said housing end walls to divide said cavity into a plurality of chambers, the volume of each chamber varying as said piston member orbits; and means to regulate the admission to and exhausting from each of said chambers in sequence of a working fluid to induce orbiting of said piston member and resultant relative rotation between said shaft and housing.

2. An internal combustion engine comprising a housing having a cavity defined by an internal peripheral wall and opposed end walls; a shaft rotatably supported in said housing; a piston member journalled eccentrically on said shaft to describe an orbital path within said cavity upon relative rotation between said shaft and housing; a plurality of vanes disposed [ radially to and spaced equally ] about the axis of said shaft and supported in said housing for reciprocal movement [ radially ] with respect to said shaft axis, each of said vanes being connected to said piston member so that said piston member can move relative to each vane in a direction at right angles to the direction of reciprocation of the respective vane and at right angles to said shaft axis, whereby orbiting of said piston member effects reciprocation of said vanes relative to said housing; *a plurality of flat faces on the periphery of the piston member, the radially inner face of each vane engaging a respective flat face on the piston member parallel to the direction of relative movement between the vane and the piston member throughout the extent of said movement;* sealing means operatively disposed between each of said vanes and said piston member, said housing peripheral wall, and said housing end walls to divide said cavity into a plurality of chambers, the volume of each chamber varying as said piston member orbits; and means to regulate the admission to, ignition in and exhausting from each of said chambers in sequence of a gaseous mixture to induce orbiting of said piston member and resultant relative rotation between said shaft and housing.

3. An internal combustion engine as claimed in claim 2, wherein each of said vanes is slidably supported in respective slots in each of said end walls and said peripheral wall of said housing.

4. An internal combustion engine as claimed in claim 2, further comprising at least one member having two journal sections eccentric with respect to one another, one of said sections rotatably supported in said housing and the other of said sections rotatably supported in said piston member, with the axis of each section parallel to said shaft axis, the eccentricity of said journal sections and the location thereof relative to said shaft being such as to guide said piston member in the orbital path when said shaft rotates.

5. An internal combustion engine as claimed in claim 2, wherein each of said vanes has a radially inwardly extending portion at each axial end thereof, each said portion being connected to said piston member to prevent relative movement between said vane and piston member in the radial direction and to permit relative movement therebetween in a direction at right angles to the direction of reciprocating movement of said vane.

[ 6. An engine comprising a housing having a generally cylindrical cavity defined by a peripheral wall and opposed end walls; a shaft rotatably supported in said housing coaxial with said cavity; a piston member disposed within said cavity and journalled eccentrically on said shaft to describe an orbital path about the axis of said shaft when said shaft rotates; a plurality of vanes disposed radially to and spaced equally about said shaft axis, each of said vanes being slidably supported in respective slots in each of said end walls and said peripheral wall for reciprocal movement radially with respect to said shaft axis; each of said vanes being connected to said piston member to reciprocate relative to said housing upon orbiting of said piston member relative to said housing; sealing means operatively disposed between each of said vanes and said piston member, said housing peripheral wall, and said housing end walls to divide said cavity into a plurality of chambers, the volume of each chamber varying as said piston member orbits; and means to regulate the admission to and exhausting from each of said chambers in sequence of a working fluid to induce orbiting of said piston member and resultant rotation of said shaft.

7. An engine as claimed in claim 6, further comprising at least one member having two journal sections eccentric with respect to one another, one of said journal sections rotatably supported in said housing, and the other of said journal sections rotatably supported in said piston member with the axis of each section parallel to said shaft axis, the eccentricity of said journal sections and the location thereof relative to said shaft being such as to guide said piston member in the orbital path when said shaft rotates.

8. An engine as claimed in claim 6, wherein said piston member has an external peripheral surface including a plurality of flat sections spaced equally about the axis of said piston member, and extending the full width of said piston member in the axial direction thereof, said flat sections sealably engaging with the radially inner end of one of said vanes and extending in a plane normal to the direction of reciprocation of the respective vane. ]

9. An engine as claimed in claim [ 6 ] *3*, wherein each of said vanes has a radially inwardly extending portion at each axial end thereof, located in said respective slots in each of said end walls, each of said portions being connected to said piston member to prevent relative movement between said vane and piston member in the radial direction and to permit the relative movement therebetween in the direction at right angles to the direction of reciprocation of said vane.

[ 10. An engine comprising a housing having a generally cylindrical cavity defined by a peripheral wall and opposed end walls; a shaft rotatably supported in said housing coaxial with said cavity; a piston member disposed within said cavity and journalled eccentrically on said shaft to describe an orbital path about the axis of said shaft when said shaft rotates; a plurality of vanes disposed radially to and spaced equally about said shaft axis, each of said vanes being slidably supported in respective slots in each of said end walls and said peripheral wall for reciprocal movement radially with respect to said shaft axis, said vanes being independently connected to said piston member so that said piston member can move relative to each vane in a direction at right angles to the direction of reciprocation of the respective vane and at right angles to said shaft axis to permit orbiting of said piston member upon reciprocation of said vanes relative to said housing; sealing means operatively disposed between each of said vanes and said piston member, said housing peripheral wall and said housing end walls to divide said cavity into a plurality of chambers, the volume of each of said chambers varying as said piston member orbits; and means to regulate the admission to and exhausting from each of said chambers in sequence of a working fluid to induce orbiting of said piston member and resultant rotation of said shaft. ]

11. An engine as claimed in claim [ 10 ] *3*, further comprising at least one member having two journal sections eccentric with respect to one another, one of said journal sections rotatably supported in said housing and the other of said journal sections rotatably supported in said piston member with the axis of each section parllel to said shaft axis, the eccentricity of said journal sections and the location thereof relative to said shaft being such as to guide said piston member in the orbital path when said shaft rotates.

[ 12. An engine as claimed in claim 10, wherein said piston member has an external peripheral surface including a plurality of flat sections spaced equally about the axis of said piston member, and extending the full width of said piston member in the axial direction thereof, said flat sections sealably engaging with the radially inner end of one of said vanes and extending in a plane normal to the direction of reciprocation of the respective vane. ]

13. An engine as claimed in claim [ 12 ] *2*, wherein each of said vanes has a radially inwardly extending portion at each axial end thereof, each said extending portion of said vanes having a slipper member mounted thereon, said piston member having radial end walls at each axial end thereof, and a pair of slots associated with each of said flat sections of said peripheral surface, one of said slots in each of said end walls, each of said slots extending parallel to the associated flat section, said slipper members on each of said vanes slidably engaging the respective slots to connect said vane to said piston member to prevent relative movement between said vane and piston member in the radial direction and to permit relative movement therebetween in a direction parallel to said flat section of said piston member peripheral surface with which the vane engages.

[ 14. An engine as claimed in claim 10, wherein each of said vanes has a radially inwardly extending portion at each axial end thereof, located in said respective slots in each of said end walls, each said portion being connected to said piston member to prevent relative movement between said vane and piston member in the radial direction and to permit the relative movement therebetween in the direction at right angles to the direction of reciprocation of said vane. ]

15. An engine as claimed in claim [ 10 ] *2*, wherein said piston member is hollow, and a counter-weight is mounted within said piston member and rotatably supported by said piston member of rotation in unison with said shaft about said shaft axis, said counter-weight being of a mass and disposition relative to said shaft to statically and dynamically balance said shaft.

* * * * *